United States Patent Office 3,806,338
Patented Apr. 23, 1974

3,806,338
NICKEL-CHROMIUM ALLOY
James B. Ford, Columbus, Ohio, assignor to Owens-Corning Fiberglas Corporation, Toledo, Ohio
No Drawing. Filed Jan. 31, 1973, Ser. No. 328,209
Int. Cl. C22c 19/00
U.S. Cl. 75—171                                   8 Claims

ABSTRACT OF THE DISCLOSURE

A nickel-chromium alloy, especially suitable for making spinners used in the manufacture of glass fibers is provided by combining constituent elements at defined amounts to form a composition which provides a balance of properties to the alloy especially high strength and corrosion resistance at temperatures of molten glass.

BACKGROUND OF THE INVENTION

This invention relates to a nickel-chromium alloy for use at temperatures of molten glass. More particularly, the invention relates to an alloy composed primarily of nickel and chromium, but also includes carbon, manganese, silicon, tungsten, zirconium and tantalum, with tramp elements, including iron, aluminum, titainum, sulfur and phosphorus. The alloy is particularly suited for apparatus used in the production of glass fibers by a rotary or centrifugal process.

A rotary fiber forming process involves the introduction of molten glass, at a temperature above its liquidus, into a rotating spinner or centrifuge. A spinner, as the apparatus is known in the art, is a receptacle for receiving molten glass, which recepticle has a multiplicity of peripheral orifices, through which molten glass flows in small streams upon the action of centrifugal force upon the rotating mass. It is common to find several thousand orifices in a spinner. Molten glass, a highly corrosive medium, is introduced into the spinner which is rotating at high speeds around its own axis. Centrifugal force forces the molten glass to the periphery of the spinner and expels the molten glass as streams through the peripheral holes or orifices, into the path of a fluid medium. The streams of glass are attenuated into fine fibers as a result of the action of the fuild medium on the streams. Economic and practical commercial production rates can be achieved only when the spinner is rotated at least several thousand revolutions per minute.

It has been found that alloys, fabricated or cast into spinners which are used in the manufacturing of glass fibers, must have a composition which balances the properties of strength and corrosion resistance. Such a balance results in improving the useful service life of a spinner, an important aspect in the quality and economics of glass fiber production. An alloy to be used in glass fiber forming operations must process high strength to prevent fracture or distortion at temperatures of molten glass. The conditions under which spinners are used, specifically high temperature and high centrifugal force, necessitate an alloy having high strength.

Alloys shown in the prior art have demonstrated only one of the two required properties. As a consequence, the useful life of a spinner is severely limited by the absence of the other property. Spinners in use heretofore may be classified as having high strength and poor corrosion resistance or conversely low strength and good corrosion resistance. The prior art reveals compositions for alloys having increased strength as shown in U.S. Pat. 3,552,952, but these alloys are inferior to those alloys as shown in U.S. Pat. 3,318,694 with respect to resistance to attack by molten glass.

The alloys of this invention, however, exhibit superior resistance to attack by molten glass over the alloys of U.S. Pat. 3,552,952 and also exhibit superior high temperature strength over the alloys of U.S. Pat. 3,318,694. The alloys of this invention exhibit both high temperature strength and resistance to attack by molten glass.

In evaluating the strength of an alloy, creep or slow plastic deformation of the metal under constant load is an important factor. Creep is measured by means of a stress rupture test. In this test, which is widely used in the industry, time to failure is also measured as a function of load and temperature.

In addition to strength, the alloy must also possess the ability to resist the corrosive attack of molten glass. Corrosion of spinners, especially wear occurring at the peripheral holes therein, is the result of several influences. The combined effects of oxidation, reactions of the alloy with the molten glass, and wear due to dynamic glass as the glass is forced through the holes, contribute to hole wear or corrosion.

Corrosion of spinner holes would not be critical to glass fiber forming operations if in actual practice all holes wore at an equal rate. Adjustments in the forming process, i.e. changes in glass temperature, increase in spinner speed and changes in pressure, could then be used to compensate for the increased size of the orifices. However, in actual practice hole wear is nonuniform. A gradient of hole size results after a spinner is in operation for a given length of time. Examination of spinners shows the corrosion rate to be greater at the upper rows of the spinner than at the lower rows. Consequently, holes located at the top of the spinner are large in comparison to rows found in the middle of the spinner and at the bottom of the spinner. The holes at the bottom of the spinner substantially retain their original diameter for longer periods of time. This gradient in hole size results from the spinner having a higher temperature at the top.

Nonuniformity of orifice size results in producing glass fibers having nonuniform diameter. Fiber nonuniformity reaches a point where the deviation of fiber diameter is of such a degree as to place some of the fibers outside of the manufacturer's product specification. When this occurs, the spinner must be removed from service even though the spinner retains sufficient strength for its intended use. Strength alone or in combination with poor corrosion resistance makes an alloy virtually useless for glass fiber forming operation because of rapid nonuniform rate of hole wear. Consequently, the composition of an alloy which finds use in glass fiber forming operations must combine high corrosion resistance with strength, yielding a spinner having acceptable service life.

The alloy of this invention has longer service or useful life in comparison to any known alloy heretofore employed in glass fiber forming applications. Corrosion resistance at temperatures of molten glass in conjunction with high strength under glass fiber forming conditions is a combination unique in the art which derives from the composition herein disclosed. It is believed that the balancing of the amounts of the various constituents is responsible for the improved properties of glass corrosion and high strength at temperatures of molten glass found in glass fiber forming operations.

The alloy of the invention is particularly useful in the form of the aforementioned spinners, and is also generally useful in the glass industry for numerous high temperature service applications which require a high resistanec to attack by both molten glass and air, a low rate of creep and high load carrying ability at high temperatures.

Consequently, it is an object of this invention to provide a nickel-chromium alloy for use in high temperature centrifugal glass fiber forming operations.

It is another object of this invention to provide an alloy having improved service life in high temperature centrifugal glass fiber forming operations.

It is yet another object of this invention to provide an alloy composition which provides and balances the properties of high strength and corrosion resistance at temperatures of molten glass.

It is a further object of this invention to provide glass handling apparatus, especially in the form of spinners, which apparatus is fabricated from an alloy possessing corrosion resistance and high strength at temperatures of molten glass.

These and other objects will be readily apparent from the following detailed description which is intended only to illustrate and disclose the invention.

SUMMARY OF THE INVENTION

The nickel-chromium alloy according to the invention consists essentially of certain balanced amounts of chromium, carbon, manganese, silicon, tungsten, zirconium, tantalum and nickel along with acceptable, controlled amounts of impurities consisting essentially of iron, aluminum, titanium, sulfur and phosphorus. More specifically, the alloy of this invention comprises in percent by weight* a chromium content of about 33–36; a carbon content of about 0.30 to 0.40; a manganese content of about 0.10 to 0.30; a silicon content of about 0.80 to 1.10; a tungsten content of about 7.50 to 8.50; a zirconium content of about 0.35 to 0.80; a tantalum content of about 0.70 to 0.90; and a nickel content being essentially the balance. A number of impurities are also found in the alloy, which impurities can be tolerated up to certain indicated levels without adversely affecting the alloy's properties and/or the performance of the apparatus at temperatures of molten glass. The impurities of the alloy consist essentially of iron, aluminum, titanium, sulfur and phosphorus. These impurities are introduced into the alloy with the charge materials and their amounts must be strictly controlled to keep the respective amounts below the following percent by weight: iron, 0.50; aluminum, 0.10; titanium, 0.10; sulfur, 0.015 and phosphorus, 0.015.

In practicing the invention, this nickel base alloy comprises a high chromium content in order to form a protective oxide, which oxide imparts glass corrosion resistance to the alloy and at the same time functions as a carbide former. If the chromium content is too low, an alloy having unacceptable glass corrosion resistance results. Practice has revealed that a chromium content less than about 33 percent by weight* leads to poor corrosion resistance. On the other hand, if there is a significant excess of chromium present, the alloy will be characterized by poor strength and phase instability.

Silicon is included in the alloy composition in order to impart corrosion resistant characteristics to the alloy. However, it was found that much like chromium, silicon in excess results in poor strength and phase instability. A silicon content of about 1.10 percent by weight yields an alloy having optimum properties, by striking a balance between strength and glass resistance. Silicon is also present to facilitate the casting of the alloy, by improving the alloy's fluidity during casting processes.

Carbon is present in the alloy composition to promote the formation of carbides, in the form of small discrete particles for strengthening. Only a small amount of carbon is necessary to fulfill this requirement. It has been found that when an excess volume of carbides are present, the corrosion resistance drops to an unacceptable level. A carbon content between 0.30 percent and 0.40 percent has been found to impart this alloy with a maximum level of corrosion resistance, while maintaining a sufficient amount of carbides for strength.

The inclusion of tungsten in the alloy composition is important to the strength of the alloy. An excess of tungsten in the composition results in a loss of corrosion resistance and causes phase instability, whereas an insufficient amount of tungsten does not impart the desired strength properties to the alloy. In order to impart strength and resistance to molten glass corrosion, the amount of tungsten used in the composition is critical.

In order to impart sufficient strength to the alloy, it has been found that only about 0.7 to 0.9 percent by weight tantalum is required. A lower tantalum content will cause the alloy to lack the necessary strength whereas higher amounts of tantalum results in no additional benefits and tend to promote greater phase instability. A low tantalum content is also desirable from an economic standpoint. Inclusion of more than the required amount of tantalum will cause a large increase in the cost of the alloy, since tantalum is one of the most costly constituents of this composition.

Zirconium at a level corresponding to at least 0.35 percent by weight must be present to obtain high temperature strength. When the zirconium level exceeds the upper limit of the range, the melting point of the alloy is lowered, thereby resulting in a loss of high temperature strength. As a rule a 0.50 percent by weight zirconium content is preferred for the alloy of this invention in order to obtain glass corrosion resistance without a sacrifice in strength.

A small amount of manganese is used in order to tie up sulfur which is introduced as an impurity with the charge materials. Sulfur is a major contributor to corrosion and must be controlled. From about 0.10 to about 0.30 percent by weight manganese is sufficient for this purpose. If the manganese content exceeds this range, loss of strength and phase instability results.

The alloy in the invention provides an improved combination of desirable characteristics and properties. Preparation and evaluation of a number of alloys containing more and less of the various alloying constituents has established that the particular specified elements and balanced amounts are necessary to realize the advantages of this invention. The superior service life and excellent corrosion resistance to glass of the alloy of this invention are believed to be provided by a unique balancing of the amounts of the various constituents.

The alloy of this invention may be prepared in accordance with recognized present-day melt procedures for nickel-chromium alloys. Desirably the constituents used are in master alloys to avoid unwanted impurities and to carefully control the final alloy composition. Preferably the melting is accomplished with a neutral crucible under vacuum. However, if desired, the charge when in a molten state, may be protected by an argon atmosphere. Other and additional charges of chromium, carbon, manganese, silicon, tungsten, zirconium, tantalum and the like required to arrive at the desired alloy composition may then be added when the melt temperature is about 2700° F. to about 2800° F. Alternatively, these elements may be added with the original charge of chromium and nickel. Heating is continued and generally the melt is between about 2830° F. and 3000° F. when poured.

Fabricated articles are usually made from the nickel-chromium alloys of this invention by casting. Such articles ---
*Unless expressly stated otherwise, all percents herein and in the appended claims are expressed as percents by weight.

include spinners, centrifuge buckets, bushing support frames, or the like. The alloy as cast can be welded and machined. Preferably the articles are fabricated by vacuum investment casting.

DESCRIPTION OF THE PREFERRED EMBODIMENTS

The nickel-chromium alloy of this invention has a composition falling within the range as shown below:

EXAMPLE I

| Element: | Percent by weight |
|---|---|
| Chromium | 33.00–36.00 |
| Carbon | 0.30–0.40 |
| Manganese | 0.10–0.30 |
| Silicon | 0.80–1.10 |
| Tungsten | 7.50–8.50 |
| Zirconium | 0.35–0.80 |
| Tantalum | 0.70–0.90 |
| Nickel | Balance |

Iron, aluminum, titanium, sulfur and phosphorus are impurities that are introduced with the charge materials and can be tolerated to a degree without adversely affecting the properties of this alloy, especially high temperature strength and resistance to corrosion temperatures of molten glass. The following indicated amounts of these impurities, when not exceeded, do not affect the properties of this alloy: iron—0.50 percent by weight, aluminum—0.10 percent by weight; titanium—0.10 percent by weight; sulfur—0.015 percent by weight; and phosphorus —0.015 percent by weight.

Specific examples of the alloys of this invention were prepared according to the above-described procedure. These alloys consisted essentially of the following weight percentages.

EXAMPLE II

| Element: | Percent by weight |
|---|---|
| Chromium | 34.5 |
| Carbon | 0.35 |
| Manganese | 0.20 |
| Silicon | 1.00 |
| Tungsten | 8.00 |
| Zirconium | 0.50 |
| Tantalum | 0.80 |
| Nickel | Balance |

EXAMPLE III

| Element: | Percent by weight |
|---|---|
| Chromium | 33.00 |
| Carbon | 0.30 |
| Manganese | 0.15 |
| Silicon | 1.10 |
| Tungsten | 7.50 |
| Zirconium | 0.80 |
| Tantalum | 0.90 |
| Nickel | Balance |

EXAMPLE IV

| Element: | Percent by weight |
|---|---|
| Chromium | 35.50 |
| Carbon | 0.35 |
| Manganese | 0.20 |
| Silicon | 0.90 |
| Tungsten | 8.50 |
| Zirconium | 0.60 |
| Tantalum | 0.70 |
| Nickel | Balance |

Glass handling apparatus, particularly spinners employed in producing glass fibers by the rotary process were cast and machined from the above alloys. These spinners had several thousand stream-forming radial orifices in a generally cylindrical outer peripheral wall which was approximately ¼ to ⅜ inch thick. The outer peripheral wall was supported by an upper conical wall which extended inwardly to a suitable means of attachment to a rotating quill of a rotary fiber forming apparatus. These spinners demonstrated about a 100% improvement in service life over spinners from the alloys of U.S. Pat. 3,318,694.

I claim:

1. Glass processing apparatus in the form of a cast spinner, said spinner having a plurality of peripheral orifices therein through which molten glass passes to form tiny filaments of glass, and said spinner being fabricated from an alloy consisting essentially of:

| Element: | Percent by weight |
|---|---|
| Chromium | 33.00–36.00 |
| Carbon | 0.30–0.40 |
| Manganese | 0.10–0.30 |
| Silicon | 0.80–1.10 |
| Tungsten | 7.50–8.50 |
| Zirconium | 0.35–0.80 |
| Tantalum | 0.70–0.90 |
| Nickel | Balance | wherein the alloy possesses high strength and resistance to glass corrosion at temperatures of molten glass.

2. Glass processing apparatus in the form of a cast spinner, said spinner having a plurality of peripheral orifices therein through which molten glass passes to form tiny filaments of glass, and said spinner being fabricated from an alloy consisting essentially of:

| Element: | Percent by weight |
|---|---|
| Chromium | 34.5 |
| Carbon | 0.35 |
| Manganese | 0.20 |
| Silicon | 1.00 |
| Tungsten | 8.00 |
| Zirconium | 0.50 |
| Tantalum | 0.80 |
| Nickel | Balance | wherein the alloy possesses high strength and resistance to glass corrosion at temperatures of molten glass.

3. Glass processing apparatus in the form of a cast spinner, said spinner having a plurality of peripheral orifices therein through which molten glass passes to form tiny filaments of glass, and said spinner being fabricated from an alloy consisting essentially of:

| Element: | Percent by weight |
|---|---|
| Chromium | 33.00 |
| Carbon | 0.30 |
| Manganese | 0.15 |
| Silicon | 1.10 |
| Tungsten | 7.50 |
| Zirconium | 0.80 |
| Tantalum | 0.90 |
| Nickel | Balance | wherein the alloy possesses high strength and resistance to glass corrosion at temperatures of molten glass.

4. Glass processing apparatus in the form of a cast spinner, said spinner having a plurality of peripheral orifices therein through which molten glass passes to form tiny filaments of glass, and said spinner being fabricated from an alloy consisting essentially of:

| Element: | Percent by weight |
|---|---|
| Chromium | 35.50 |
| Carbon | 0.35 |
| Manganese | 0.20 |
| Silicon | 0.90 |
| Zirconium | 0.60 |
| Tungsten | 8.50 |
| Tantalum | 0.70 |
| Nickel | Balance | wherein the alloy possesses high strength and resistance to glass corrosion at temperatures of molten glass.

5. An alloy suitable for casting, consisting essentially of:

| Element: | Percent by weight |
|---|---|
| Chromium | 33.00–36.00 |
| Carbon | 0.30–0.40 |
| Manganese | 0.10–0.30 |
| Silicon | 0.80–1.10 |
| Tungsten | 7.50–8.50 |
| Zirconium | 0.35–0.80 |
| Tantalum | 0.70–0.90 |
| Nickel | Balance | said alloy being characterized by resistance to corrosive attack by molten glass and by having high strength at temperatures of molten glass.

6. An alloy suitable for casting, consisting essentially of:

| Element: | Percent by weight |
|---|---|
| Chromium | 34.5 |
| Carbon | 0.35 |
| Manganese | 0.20 |
| Silicon | 1.00 |
| Tungsten | 8.00 |
| Zirconium | 0.50 |
| Tantalum | 0.80 |
| Nickel | Balance | said alloy being characterized by resistance to corrosive attack by molten glass and by having high strength at temperatures of molten glass.

7. An alloy suitable for casting, consisting essentially of:

| Element: | Percent by weight |
|---|---|
| Chromium | 33.00 |
| Carbon | 0.30 |
| Manganese | 0.15 |
| Silicon | 1.10 |
| Tungsten | 7.50 |
| Zirconium | 0.80 |
| Tantalum | 0.90 |
| Nickel | Balance | said alloy being characterized by resistance to corrosive attack by molten glass and by having high strength at temperatures of molten glass.

8. An alloy suitable for casting, consisting essentially of:

| Element: | Percent by weight |
|---|---|
| Chromium | 35.50 |
| Carbon | 0.35 |
| Manganese | 0.20 |
| Silicon | 0.90 |
| Tungsten | 8.50 |
| Zirconium | 0.60 |
| Tantalum | 0.70 |
| Nickel | Balance | said alloy being characterized by resistance to corrosive attack by molten glass and by having high strength at temperatures of molten glass.

References Cited

UNITED STATES PATENTS

| 3,552,952 | 1/1971 | Shaw | 75—171 |
| 3,318,694 | 5/1967 | Heitmann | 75—171 |

RICHARD O. DEAN, Primary Examiner

U.S. Cl. X.R.

65—1, 15